A. J. ARBUCKLE.
APPARATUS FOR SEPARATING THE LIQUID AND SOLID COMPONENTS OF MIXTURES OF LIQUIDS AND CRUSHED OR GROUND ORE PRODUCTS.
APPLICATION FILED DEC. 30, 1921.

1,422,514.  Patented July 11, 1922.

A. J. ARBUCKLE.
APPARATUS FOR SEPARATING THE LIQUID AND SOLID COMPONENTS OF MIXTURES OF LIQUIDS AND CRUSHED OR GROUND ORE PRODUCTS.
APPLICATION FILED DEC. 30, 1921.

1,422,514.

Patented July 11, 1922.

Witness:
Arthur Thompson

Inventor:
Alexander John Arbuckle

A. J. ARBUCKLE.
APPARATUS FOR SEPARATING THE LIQUID AND SOLID COMPONENTS OF MIXTURES OF LIQUIDS AND CRUSHED OR GROUND ORE PRODUCTS.
APPLICATION FILED DEC. 30, 1921.

1,422,514.

Patented July 11, 1922.

Witness:
Arthur Thompson

Inventor:
Alexander John Arbuckle

UNITED STATES PATENT OFFICE.

ALEXANDER JOHN ARBUCKLE, OF JOHANNESBURG, TRANSVAAL, SOUTH AFRICA.

APPARATUS FOR SEPARATING THE LIQUID AND SOLID COMPONENTS OF MIXTURES OF LIQUIDS AND CRUSHED OR GROUND ORE PRODUCTS.

1,422,514.  Specification of Letters Patent.  Patented July 11, 1922.

Application filed December 30, 1921. Serial No. 525,995.

*To all whom it may concern:*

Be it known that I, ALEXANDER JOHN ARBUCKLE, a subject of the King of Great Britain, and resident of Johannesburg, in the Transvaal Province of the Union of South Africa, have invented certain new and useful Improvements in Apparatus for Separating the Liquid and Solid Components of Mixtures of Liquids and Crushed or Ground Ore Products, of which the following is a specification.

This invention has reference to an apparatus or means for separating the liquid, (such as the solutions used for dissolving the precious metals out of their ores, or water) and solid components of mixtures of liquids and crushed or ground ore products.

The apparatus is applicable for separating either the coarser products (sands) or the finer products (slimes) or both, when associated, from such solutions or water.

The object of the present improvements is to devise means whereby a more complete separation of the liquid and solid components of such mixtures can be obtained than is usual by existing means. By effecting a more complete separation of the solvent solutions from the solid component, a better recovery of the dissolved precious metals is obtained. With an apparatus constructed in accordance with this invention the separated solids contain a very small quantity of liquid with a corresponding high recovery of the solution and the precious metal values therein contained.

The invention will now be fully described with the aid of the accompanying drawings wherein.

Referring more particularly to Figs. 1 to 8 and 11, 1 denotes the tank, receptacle or vessel, which is, as shown, of cylindro-conical shape. The inverted, truncated, conical lower portion 2 of this tank is fitted at the bottom or truncated lower end with a part or casting 3 of conical shape in its upper portion and of substantially semi-cylindrical shape in its lower portion, which latter portion, at the one end, is constructed to form a stuffing box 4, which is fitted with a gland 5. The other end of this part or casting 3 is connected to a cylindrical casing, barrel or pipe 6.

Figures 1, 2, 3:
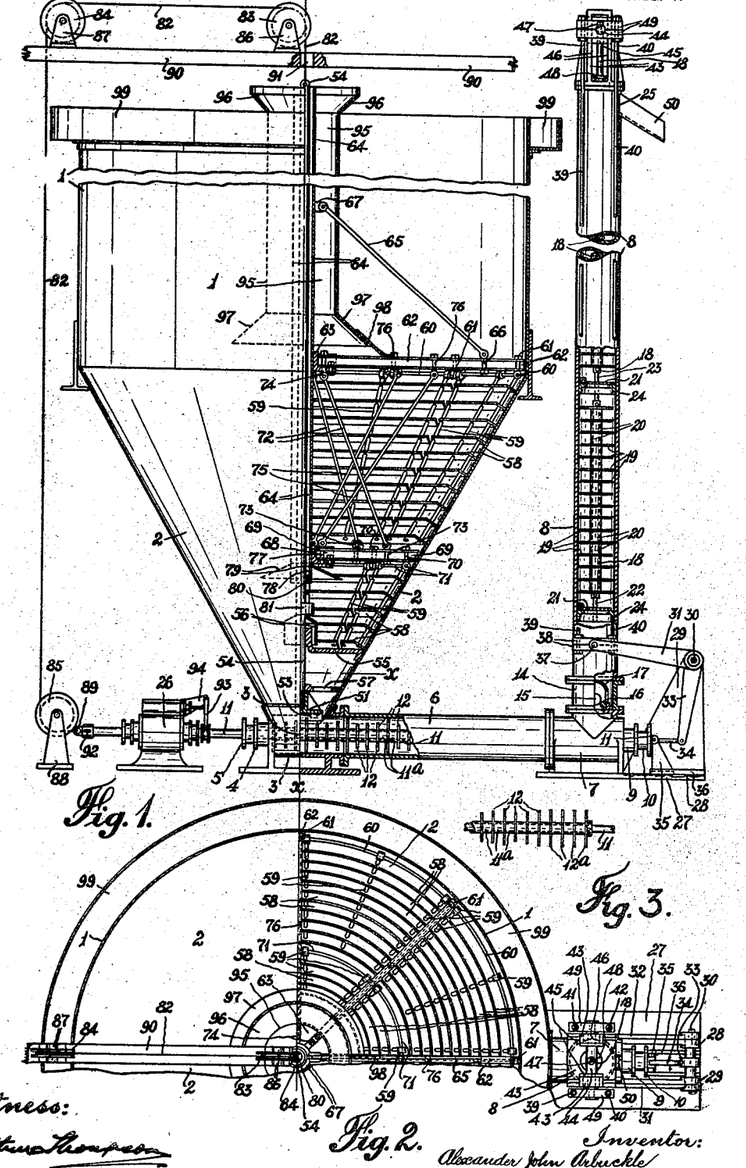
Fig. 1 is a part-sectional elevation of a tank equipped with the invention in one form.
Fig. 2 is a part plan of Fig. 1, with certain portions removed.
Fig. 3 is an elevation of portion of the horizontal conveying arrangement.

In the case of the cylindro-conical tank shown, the casing or barrel 6 is preferably disposed horizontally.

For the other and outer end of the horizontal casing or barrel 6 a further part or casting 7 is provided and suitably connected thereto. This further part or casting 7 serves as a receiving chamber for the solids which are conveyed, by the means hereinas the feed chamber for a vertical barrel, pipe or cylinder 8. The part or casting 7 is constructed on the one side to form a stuffing box 9 fitted with a gland 10.

In the horizontal casing or barrel 6 there is arranged a shaft or rod 11, upon which there is secured a number of preferably circular plates or discs 12, arranged in groups or sets. The discs or plates 12 of each group or set may be of gradually increasing size or diameter in the direction of the feed chamber 7. The discs or circular plates 12 are spaced apart along the shaft or rod 11, either at regular, as shown, or irregular intervals by the tubular distance pieces 11$^a$, and each group or set of gradually increasing diameter may comprise four, as shown, or any other desired number of such discs or plates 12. The discs or plates 12 are provided along a suitable portion of the length of the shaft or rod 11, allowance being made for the movement of the horizontal rod 11. The corresponding discs or plates 12 of each group or set may be of the same diameter, as shown, or otherwise, as preferred. A number of the discs at the delivery end of the horizontal barrel may be of uniform diameter as shown in Fig. 3, in which the four last discs 12$^a$ are of equal size.

Figures 4, 5, 6, 11, 17:
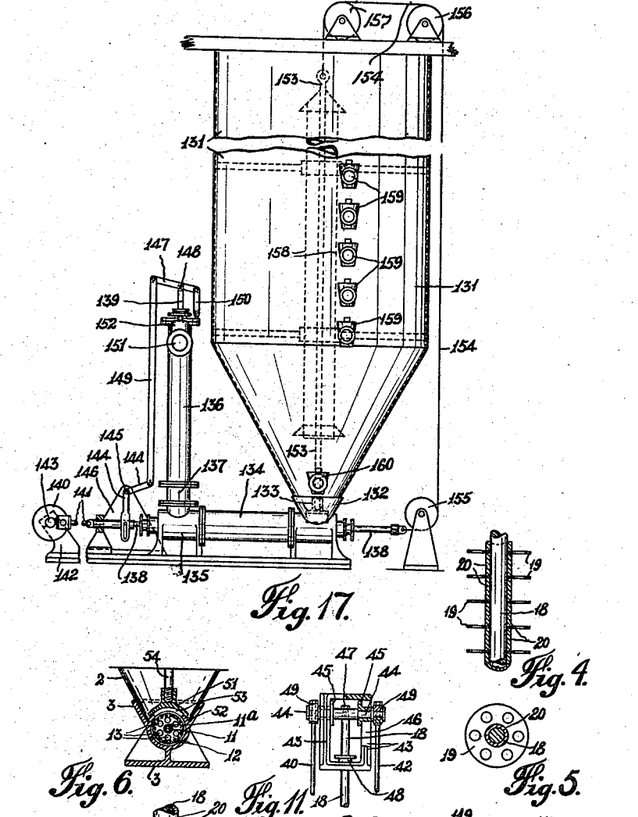
Fig. 4 is a sectional elevation of part of the vertical conveying or elevating means.
Fig. 5 is a plan of Fig. 4.
Fig. 6 is a sectional elevation of portion of the bottom of the tank and the part or casting which is connected therewith, the plane of section being indicated by the dotted line $x$—$x$, in Fig. 1.
Fig. 11 is a part-sectional elevation of a portion of the means for actuating the vertical conveyor or elevator.
Fig. 17 is an end elevation of an agitating tank equipped with the invention in a form adapted thereto.

As shown in Fig. 6, there is preferably formed in each of the discs or circular plates 12, a ring or plurality of holes 13, which may be of circular (as shown) or any other preferred shape. The plates or discs 12 may be so positioned that the holes 13 formed in all the plates or discs 12 may be opposite to each other, or so that the said holes may be staggered in succeeding plates or discs, as may be preferred or found most suitable.

The internal diameter of the barrel, pipe or cylinder 6 is preferably somewhat larger than the diameter of the largest of the discs or circular plates 12 of each group or set so that an annular space is left or formed between the interior of said barrel 6 and the rim or exterior of the largest of the discs or plates 12. If preferred, the discs 12, or some of them may be made of such size as to be a sliding fit inside the barrel or casing 6.

The ends of the shaft or rod 11 carrying the discs 12 pass and work through the stuffing boxes and glands 4, 5, and 9, 10, respectively, provided at the outer ends of the two castings or parts 3, 7, forming the receiving chamber beneath the cone 2, and the receiving and feed chamber for the vertical barrel 8.

Upon the top of the part or casting 7 and immediately above the feed chamber for the vertical conveying arrangement, a part 14 is fixed which forms a housing for a ball or other suitable valve or valve device 15 which operates automatically to close the communication between the vertical barrel 8 and the said feed chamber on the downstroke of the conveying means in said vertical barrel 8. 16 is the seating for the ball valve 15 and 17 a guard or cage for limiting the lift of the valve 15.

In the vertical barrel 8 which is secured upon the top of member 14, the vertical conveying or elevating device is arranged which is constructed on somewhat similar lines to the conveying means in the horizontal barrel 6; that is to say, said conveying or elevating device consists of a sectional vertical rod or shaft 18 upon which are secured perforated discs or circular plates 19, spaced apart by distance pieces 20 like those of the horizontal conveyor. These discs 19, however, are preferably of uniform diameter. The rod 18 is suspended from the top of the vertical barrel 8 and operates therein with an up-and-down or reciprocatory motion. Suitable valves or valve devices 21—see also Figs. 7 and 8—are provided on the vertical rod or shaft 18 at the bottom of this elevating device and in any other position or positions intermediate the ends of the rod or shaft 18, said valves 21 being so constructed as to close on the up-stroke and open on the down-stroke of said elevating device. The parts forming the seating for the valves may be made of the same diameter as the interior of the barrel 8 so that they will operate as guiding means for the elevating device in the barrel 8. The bottom valve 21 may be attached to the lower end of the bottom section of the rod 18 by means of a U-shaped piece 22 which will allow the valve to open freely on the down-stroke. The other valve or valves 21 may be disposed intermediate the ends of the sections of the rod 18, and be carried by means of links 23 engaging in the ends of the sections and passing through the sides of the part 24 forming the valve seating on which the valve 21 is hinged. The discs or circular plates 19 of the device, are, as shown, also preferably of somewhat smaller diameter than the internal diameter of the barrel 8.

At a convenient point in the vertical barrel 8, at or near the top thereof, there is provided an outlet 25 for the solids which are elevated up the barrel 8. The rod or spindle 18 of the elevating means extends through the top of the vertical barrel 8.

Means are provided for reciprocating the horizontal and vertical conveyors through the medium of their shafts 11 and 18, respectively, and such means are so designed that when the horizontal shaft 11 is moved through its outward stroke, the vertical shaft 18 is moved through its downward stroke. The driving means shown for the horizontal and vertical conveying and elevating arrangements includes a suitable engine 26, which is positioned near the casting 3 and is adapted to impart reciprocatory motion to the horizontal rod or shaft 11 at a suitable speed. Near the casting 7 there is arranged a bracket comprising a base plate 27 and the two vertical side plates 28, 29, which latter support a rod or spindle 30 on the ends of which are mounted the levers 31, 32. 33 is a further lever fixed on rod or spindle 30 centrally thereof. The lever 33, at its lower end, is attached by means of a link 34 to that end of the rod 11 which works through the gland 10. 35 is a crosshead which is adapted to slide backwards and forwards in guides 36 and is connected at its upper end to the outer end of the rod 11 by means of the pin which connects the link 34 thereto. The levers 31, 32, at their other ends are each provided with a pin 37, each of which pins works freely in a hole formed by and between two blocks or pieces 38 which are connected by means of the two vertical long side rods 39, 40, and 41, 42, respectively. The one pair or rods 39, 40, is positioned at the one side of the barrel 8 and the other pair 41, 42, at the opposite side thereof, and they extend upwardly for a suitable distance beyond the upper end of the barrel 8.

On the upper end of the barrel 8 there is secured a guide frame 43 in which works a crosshead comprising a spindle 44 and two sliding pieces 45 which engage and slide in the guideways 46. To the spindle 44 the upper end of the vertical rod 18 is attached as indicated at 47, 48 is a gland fitted in the guide frame 43 through which the rod 18 works. The upper ends of the rods 39, 40, and 41, 42, are connected to blocks or pieces 49 in which the outer and reduced ends of the spindle 44 freely work. By this means the radial motion of the levers 31, 32, is utilized to impart the reciprocatory rectilinear motion to the vertical rod 18, through the medium of the blocks or pieces 38, side rods 39, 40, 41, 42, blocks or pieces 49 and spindle 44.

If desired or found necessary, inspection doors for providing access to the valve or valves or any other part of the internal arrangement can be provided in any suitable position or positions in the casings 6, 8.

An outlet fitted with a chute 50 is provided at the top of the vertical casing or barrel 8 for delivering the solids into any suitable vessel, vehicle or receptacle, or on to or into any suitable means or arrangement which will serve to convey or deliver the same directly or otherwise into such vehicle or receptacle, or otherwise, as preferred. Such arrangement may, if requisite, be combined with means for imparting a vibratory or other suitable motion to it to assist the passage of the separated thick material or solids down or along it to the vessel, vehicle, et cetera.

Means are provided inside the tank for controlling the inflow of the settled solid component of the mixture into the part or casting 3 of the horizontal conveying means. Such device may be in the form of a movable cover or valve 51,—see Figs. 1 and 6— co-operating with a seating 52 provided for it around the opening 53 inside the casting 3. The valve 51 may be suitably packed, if desired. This valve 51 may be operated by means of a rod 54 extending vertically upward through the tank and working through a guide 55 consisting of radial arms and a central boss through which the rod 54 works; the radial arms being fixed at their outer ends to the inside of the tank, at a suitable distance above the bottom thereof. The bottom guide 55, which is normally in the mass of settled solids in the bottom of the tank, is enclosed by a hood 56 fixed around the rod, which hood is air-tight at the top where it is attached to the rod 54, so that a quantity of air is retained therein which tends to keep the solids away from the guide.

57 is a member arranged around and secured upon the spindle or rod 54 at a suitable distance above the valve 51, which member may be, as shown, in the form of an annular piece or ring, attached by means of radial arms and a hub to the spindle 54, for forcing the settled material down past the valve 51 through the opening 53 in the casting or part 3.

In the conical lower portion 2 of the tank 1 there is provided an arrangement for detaching the solids which settle upon the surface of the inside of the conical portion 2. Such means are shown comprising a suitable number of loosely suspended or hanging members or scrapers 58 which are adapted to engage with or rest upon the sides of the tank, and, when moved upwards and downwards, to scrape the tank and detach the solids which settle upon the internal surface of the cone 2. The scraping means is shown arranged in two sets, the one set being arranged above the other, and each set may, as shown, comprise say eight groups. Each group is shown comprising a suitable number of curved concentric plates or bars 58 attached to suspension rods or bars 59. The rods or bars 59 of the upper group, at their upper ends, are connected to a ring 60, fixed by eyebolts 61 to the outer ends of radial members or arms 62; said radial arms 62 being fixed at the centre to a centre piece or hub 63, secured around a pipe or tubular member 64 (hereinafter referred to) disposed concentrically around the valve actuating rod 54. These arms or members 62, at their outer ends, may be additionally supported from the upper portion of the pipe or tubular member 64, by means of stays or rods 65, attached by eyebolts 66 to the arms 62, and by a clamp 67 to the pipe 64. The lower set of scrapers may be similarly loosely supported from the central tubular member 64 by a boss 68, fixed on tube 64, radial arms or members 69, eyebolts 70 and ring 71, and be additionally connected and stayed by stays 72 attached by eyebolts 73 to the radial members 69, and eyebolts 74 to the hub 63, and stays 75 attached by eyebolts 76 to the arms 62, and eyebolts 77 to the boss 68.

The lower set of scrapers is arranged to operate on the inner surface of the cone below the upper set, the sets being of such a length that a portion of the interior surface of the cone intermediate the upper and lower set of scrapers is not scraped by them. This precludes the passage of liquid down through the mass of settled solids in that portion in which the scrapers do not operate.

It is preferred to provide means in the tank below the normal level of settled material which will receive and lead any air that may be released or rise through the material and deliver the same above the level of the liquid in the tank. Such means, as shown, consists in providing in the lower end of the tube 64 one or more holes 78, and attaching to the lower end of the pipe 64, immediately above the said hole or holes 78, a cone shaped piece 79. The pipe or tube 64, which is disposed concentrically around the rod 54, is closed at the bottom by a ring 80, and the two sets of scrapers are operated by it.

The tube 64 and cone 79 form the arrangement through the medium of which air is eliminated; any air which enters the cone 79 passing through the holes 78 and up through the pipe or tube 64 and out at the open top. This, by preventing such air from passing through the liquid contents of the tank, precludes the possibility of the agitation of the contents of the tank by uprising bubbles of air.

Both sets of scrapers 58 together with the means for eliminating the air are lifted through the medium of the valve rod 54, and the arrangement is such that, after the valve 51 is raised to a certain extent, the lower end of the concentric pipe or tubular member 64 is engaged by a collar 81 on the valve rod 54 and so lifted by the further upward movement of such valve rod 54.

To ensure the operation of the valve device 51 and the scraping means synchronizing or working in unison with the horizontal and vertical conveying means, the said valve and scraping devices may be operated by means of the same engine or power device 26, although they may be otherwise actuated in consonance with the movements of said conveying means.

The means shown for operating the valve 51 and the two sets of scraping devices off the engine 26 include a rope, chain or other flexible medium 82 attached to the upper end of the central valve rod 54, guide pulleys 83, 84, 85, (mounted in brackets 86, 87, 88) over which the rope or the like 82 passes, and means 89 connecting said rope or the like 82 to the one end of the shaft or rod 11 of the horizontal conveying means. The brackets 86, 87, for the top guide pulleys 83, 84, are carried by a suitably supported beam 90 which extends at a suitable height above and across the top of the tank 1; 91 being a hole in the beam 90 for the rope to pass through. The means shown for connecting the rope 82 to the horizontal shaft 11 consists of the eye-piece 89 which is secured on the end of the shaft 11 by the cotter 92. This connection allows of the disconnection of the valve 51 from the engine if and when desired to allow the valve to close and shut off the supply of the solid component to the part or casting 3. The valve of the engine 26 is actuated by means of a lever 93 fulcrumed on a suitable support at 94, and, at its other end, engaging with and oscillated by the horizontal shaft 11. By this means the devices within the tank are operated, off the main engine, in such a manner that the valve is opened simultaneously with the out-stroke of the horizontal conveying means and the downward stroke of the vertical elevating means. This arrangement of the driving means gives the further advantage that the vertical conveying means serves partially to counterbalance the weight of the scraping devices, et cetera, inside the tank, when said devices are raised by the upward movement of the rod 54, as previously explained.

The mixture of solids and liquid to be treated is introduced into the tank 1 through the medium of a feed or inlet pipe 95, concentrically arranged around the aforementioned air eliminating tube 64. The inlet pipe 95 may be constructed of conical or similar shape both top and bottom, as indicated at 96 and 97, respectively, and be arranged to deliver the inflowing pulp on to the circular or similarly shaped plate or hub 63 of the radial arms 62 which carry the upper set of scrapers. This feed pipe 95 may be supported by brackets 98 from the radial arms 62 carrying the upper set of scrapers, accordingly the feed pipe 95 will move up and down with the scraping means. The cone 97 at the bottom of the feed pipe will serve as a further means for removing any air which may rise in the contents of the tank and operate to deliver the same by providing an outlet passage therefor through the medium of the feed or inflow pipe.

The upper edge of the tank will ordinarily be provided with an annular rim launder 99 for receiving the overflowing water or solution.

Figures 7, 8, 9, 10:
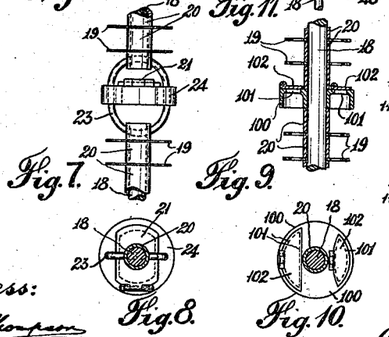
Fig. 7 is an elevation of portion of the vertical conveyor or elevator illustrating one of the valve devices.
Fig. 8 is a plan of Fig. 7.
Fig. 9 is a sectional elevation of portion of the vertical conveyor or elevator illustrating a modified form of the valve device.
Fig. 10 is a plan of Fig. 9.

In Figs. 9 and 10, I show a modified form of the valve device for use in the construction of the vertical conveying means. In this form I employ an annular piece 100 which is placed around the shaft 18 and is constructed with holes 101, with which the clacks or flap valves 102, which are hinged to the annular piece 100, co-operate, opening on the down-stroke and closing on the up-stroke to lift the separated solid component of the mixture up the barrel 8.

Figure 12:
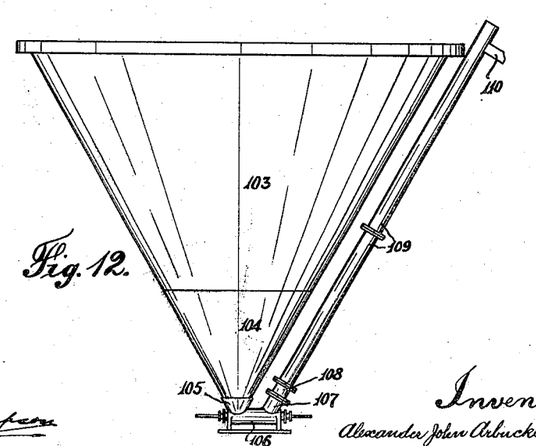
Fig. 12 is an elevation of another form of tank provided with the invention.

In Fig. 12 I illustrate an inverted truncated conical vessel 103 fitted at the bottom with a correspondingly shaped portion 104 to receive the scraping devices. The portion 104 has the part or casting 105 fitted to it and said part 105 is constructed with a short horizontal barrel or casing 106 in which is arranged the horizontal conveying means, which may be constructed and actuated as described in connection with Figs. 1 to 3 and 6. The outer end of barrel 106 is constructed with a branch 107 to which is attached the part 108 which constitutes the valve housing.

109 is the casing or barrel for the elevating means or device. This casing is shown constructed in two sections, the lowermost section being attached to the valve housing 108 and the other section extending to a suitable height above the top of the conical tank 103. In the inclined casing or barrel 109 the elevating means or device will be arranged and be actuated in a manner similar to that explained in connection with Figs. 1, 2, 4, 5 and 7 to 11, to discharge the solids, by way of the chute 110 near the top of the inclined casing.

Figure 13:
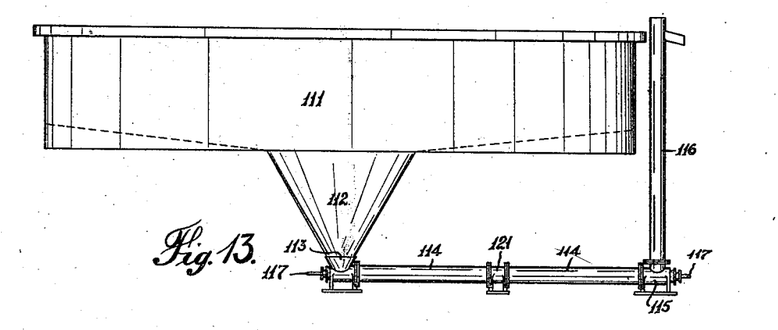
Fig. 13 is an elevation of a further form of tank with the invention applied thereto.

In Fig. 13 I illustrate the adaptation of the invention to a shallow cylindrical tank 111 of large diameter. In this case the tank 111 is fitted with the inverted truncated conical portion 112 to which is attached the part or casting 113. A horizontal barrel or casing 114 is provided connected at one end to the part 113 and, at the other end connected to a part or casting 115, which latter serves as the receiving chamber for said horizontal conveyor and as a feed chamber for the casing or barrel 116 of the vertical elevating means.

Figure 15:
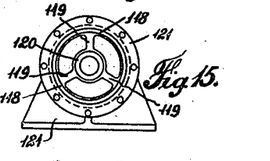
Fig. 15 is an end elevation of one of the intermediate supporting and guiding means.
Figure 16:
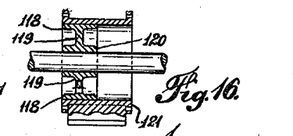
Fig. 16 is a sectional elevation at right angles to Fig. 15.

The comparatively long barrel 114 is shown provided with supporting and guiding means for the shaft or rod 117 of the horizontal conveyor which means consists —see Figs. 13, 15 and 16—of a part comprising an outer cylindrical or annular portion 118, radial arms or spokes 119 and a centre boss or hub 120, through which latter the shaft 117 is free to slide when said shaft is reciprocated. The portion 118 is free to move or slide in a guide 121 interposed between the ends of the sections of the barrel or casing 114 or alternatively in contact with the inside of the barrel 114.

Figure 14:
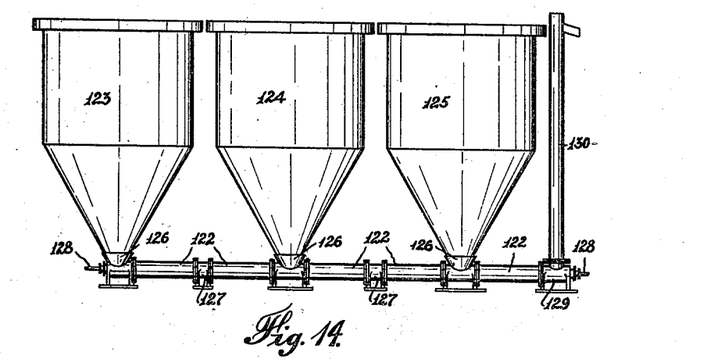
Fig. 14 is an elevation of several tanks, and illustrating the application thereto of the invention.

In Fig. 14 I illustrate the adaptation of the invention to a series of adjacent tanks. In this arrangement the barrel or casing 122 of the common horizontal conveying means is arranged underneath all the tanks and connected with the bottom of each of the three tanks 123, 124, 125, by a casing or member 126. 127 are supporting and guiding means for the shaft or rod 128 of the horizontal conveyor interposed in the barrel or casing 122 between the tanks 123, 124, and 124, 125. 129 is the part or casting which serves as the receiving chamber for the horizontal conveyor and as the feed chamber for the casing or barrel 130 of the vertical elevating means.

In Fig. 17 I show a known type of vessel or tank 131 for agitating mixtures of ore products and solutions to dissolve the metal contents, with the invention applied thereto. The vessel 131, which is of cylindro-conical shape, is equipped at the bottom with the horizontal conveying means comprising the part or casting 132, into which the solid component passes through valve 133, the horizontal casing or barrel 134, and the further part or casting 135. The horizontal conveying means is combined with the vertical elevating means which communicates with the part or casting 135 and comprises the barrel 136 and the valve housing 137.

The horizontal conveying means and the vertical elevating means include the perforated discs or circular plates mounted upon and operated by the horizontal shaft 138, and the vertical shaft 139, respectively. The shaft 138 is driven off a disc crank 140 by a connecting rod 141; 142 being a pedestal and bearing for the shaft 143 on which disc crank 140 is mounted and through which it is driven. The arrangement for driving the vertical shaft 139 is shown comprising a slotted lever 144, fulcrumed at 145 in the framing or bracket 146, a further lever 147 pivotally attached at 148 to the upper end of shaft 139, a link 149 connecting lever 144 with the lever 147, and a link 150 which is pivotally attached at its upper end to one end of lever 147 and at its other end to the top of the vertical barrel 136. 151 is the discharge outlet of the vertical barrel 136 which outlet would ordinarily be placed at or about the level of the top of the truncated conical lower portion of the tank 131, and be provided with a valve 152.

153 represents the vertical rod which passes centrally down the tank and has attached to it and operates the valve 133. The operating means for the rod comprises the rope or the like 154 and the arrangement of guide pulleys 155, 156, 157. One end of the rope, et cetera, 154 is attached to the end of shaft 138 and the other to the upper end of the rod 153.

158 is the ordinary pipe for establishing circulation of the contents of the tank by compressed air, as usual, and 159 are valves for drawing off the liquid component of the mixture after the solids have settled in the tank; 160 being the ordinary drain cock.

What I claim as my invention and desire to protect by Letters Patent is:

1. Apparatus for separating the liquid and solid components of mixtures of liquids and crushed or ground ore products, comprising, in combination, a settling vessel, and means for removing the settled solids therefrom including a casing, which is in communication with the bottom of the vessel, a rod adapted to be reciprocated in said casing, and plates having openings and arranged upon and spaced apart along the length of said rod.

2. Apparatus for separating the liquid and solid components of mixtures of liquids and crushed or ground ore products, comprising, in combination, a settling vessel, a valve in said vessel, means for removing the settled solids from said vessel, including a casing, which is in communication with the bottom of the vessel, a rod adapted to be reciprocated in said casing and plates having openings and arranged upon and spaced apart along the length of said rod, and means for reciprocating said rod and for opening the valve on the out-stroke of said rod.

3. Apparatus for separating the liquid and solid components of mixtures of liquids and crushed or ground ore products, comprising, in combination, a settling vessel, means for detaching the settled solids from the wall of the vessel, and means for removing the settled solids from the vessel, said means including a casing, which is in communication with the bottom of the vessel, a rod adapted to be reciprocated in said casing and plates having openings and arranged upon and spaced apart along the length of said rod.

4. Apparatus for separating the liquid and solid components of mixtures of liquids and crushed or ground ore products, comprising, in combination, a settling vessel, a valve in said vessel, means for detaching the settled solids from the wall of the vessel, means for removing the settled solids from the vessel, said means including a casing, which is in communication with the bottom of the vessel, a rod adapted to be reciprocated in said casing, and plates having openings and arranged upon and spaced apart along the length of said rod, and means for reciprocating said rod and for opening the valve on the out-stroke of said rod.

5. Apparatus for separating the liquid and solid components of mixtures of liquids and crushed or ground ore products, comprising in combination, a settling vessel, a valve and valve rod in said vessel, means for removing the settled solids from the vessel, said means including a casing, which is in communication with the bottom of the vessel, a rod adapted to be reciprocated in said casing and plates having openings and arranged upon and spaced apart along the length of said rod, means for reciprocating the latter rod and for opening the valve on the out-stroke of said rod, and means arranged around the valve rod for removing air from the contents of the vessel.

6. Apparatus for separating the liquid and solid components of mixtures of liquids and crushed or ground ore products, comprising, in combination, a settling vessel, and means for removing the settled solids therefrom including a casing, which is in communication with the bottom of the vessel, a rod adapted to be reciprocated in said casing, and plates having openings and arranged upon and spaced apart along the length of said rod, said plates being in groups of gradually increasing size in the direction of the outlet from the casing.

7. Apparatus for separating the liquid and solid components of mixtures of liquids and crushed or ground ore products, comprising, in combination, a settling vessel, conveying means for removing the settled solids therefrom including a casing, which is in communication with the bottom of the vessel, a rod adapted to be reciprocated in said casing and plates having openings and arranged upon and spaced apart along the length of said rod, a receiving chamber at the outlet end of said casing, and means for elevating the solids from said receiving chamber.

8. Apparatus for separating the liquid and solid components of mixtures of liquids and crushed or ground ore products, comprising, in combination, a settling vessel, conveying means for removing the settled solids therefrom, including a casing which is in communication with the bottom of the vessel, a rod adapted to be reciprocated in said casing and plates having openings and arranged upon and spaced apart along the length of said rod, a receiving chamber at the outlet end of said casing, and means for elevating the solids from said receiving chamber, the casing and receiving chamber being constructed to provide stuffing boxes for the rod of the conveying means.

9. Apparatus for separating the liquid and solid components of mixtures of liquids and crushed or ground ore products, comprising, in combination, a settling vessel, conveying means for removing the settled solids therefrom including a casing which is in communication with the bottom of the vessel, a rod adapted to be reciprocated in said casing and plates having openings and arranged upon and spaced apart along the length of said rod, a receiving chamber at the outlet end of said casing, means for elevating the solids from said receiving chamber, said elevating means including a casing, a rod adapted to be reciprocated in said casing, and plates having openings and arranged upon and spaced apart along the length of said latter rod, and a valve placed intermediate the casing of the elevating means and the receiving chamber of the conveying means.

10. Apparatus for separating the liquid and solid components of mixtures of liquids and crushed or ground ore products, comprising, in combination, a settling vessel, conveying means for removing the settled solids therefrom including a casing which is in communication with the bottom of the vessel, a rod adapted to be reciprocated in said casing and plates having openings and arranged upon and spaced apart along the length of said rod, a receiving chamber at the outlet end of said casing, means for elevating the solids from said receiving chamber, said elevating means including a casing, a rod adapted to be reciprocated in said casing, and plates having openings and arranged upon and spaced apart along the length of said latter rod, a valve placed intermediate the casing of the elevating means and the receiving chamber of the conveying means, and valve devices arranged within the casing at suitable positions along the length of the rod of the elevating means.

11. Apparatus for separating the liquid and solid components of mixtures of liquids and crushed or ground ore products, comprising, in combination, a settling vessel, conveying means for removing the settled solids therefrom including a casing which is in communication with the bottom of the vessel, a rod adapted to be reciprocated in said casing and plates having openings and arranged upon and spaced apart along the length of said rod, a receiving chamber at the outlet end of said casing, means for elevating the solids from said receiving chamber, said elevating means including a casing, a rod adapted to be reciprocated in said casing, and plates having openings and arranged upon and spaced apart along the length of said latter rod, a valve placed intermediate the casing of the elevating means and the receiving chamber of the conveying means, and means for reciprocating the conveying means and for operating the elevating means off said conveying means in such a way that during the outward stroke of said conveying means the elevating means is moved through its inward stroke.

12. Apparatus for separating the liquid and solid components of mixtures of liquids and crushed or ground ore products, comprising, in combination, a settling vessel, means for detaching the settled solids from the wall of the vessel, conveying means for removing the settled solids from the vessel, said means including a casing which is in communication with the bottom of the vessel, a rod adapted to be reciprocated in said casing and plates having openings and arranged upon and spaced apart along the length of said rod, means for reciprocating the rod of the conveying means and means for actuating the detaching or scraping means off the driving arrangement for the conveying means.

13. Apparatus for separating the liquid and solid components of mixtures of liquids and crushed or ground ore products, comprising, in combination, a settling vessel, a valve and valve rod in said vessel, means for removing the settled solids from the vessel, said means including a casing which is in communication with the bottom of the vessel, a rod adapted to be reciprocated in said casing and plates having openings and arranged upon and spaced apart along the length of said rod, means for reciprocating the latter rod and for opening the valve on the out-stroke of said rod, and a part attached to the valve rod for moving the solid material through the valve.

14. Apparatus for separating the liquid and solid components of mixtures of liquids and crushed or ground ore products, comprising, in combination, a settling vessel, a valve and valve rod in said vessel, means for detaching the settled solids from the wall of the vessel, means for removing the settled solids from the vessel, said means including a casing which is in communication with the bottom of the vessel, a rod adapted to be reciprocated in said casing and plates having openings and arranged upon and spaced apart along the length of said latter rod, means for reciprocating said latter rod and for opening the valve on the out-stroke of said rod, a pipe disposed around the valve rod and connected to the solids detaching means, and means on the valve rod for operating the solids detaching means through the medium of said pipe.

15. Apparatus for separating the liquid and solid components of mixtures of liquids and crushed or ground ore products, comprising, in combination, a settling vessel, a valve and valve rod in said vessel, means for detaching the settled solids from the wall of the vessel, means for removing the settled solids from the vessel, said means including a casing which is in communication with the bottom of the vessel, a rod adapted to be reciprocated in said casing and plates having openings and arranged upon and spaced apart along the length of said latter rod, means for reciprocating said latter rod and for opening the valve on the out-stroke of said rod, a pipe disposed around the valve rod and connected to the solids detaching means, means on the valve rod for operating the solids detaching means through the medium of said pipe, and a device fixed around said pipe for conducting air into said pipe up which it passes to the atmosphere.

16. Apparatus for separating the liquid and solid components of mixtures of liquids and crushed or ground ore products, comprising, in combination, a settling vessel, a valve and valve rod in said vessel, means for detaching the settled solids from the wall of the vessel, means for removing the settled solids from the vessel, said means including a casing which is in communication with the bottom of the vessel, a rod adapted to be reciprocated in said casing and plates having openings and arranged upon and spaced apart along the length of said latter rod means for reciprocating said latter rod and for opening the valve on the out-stroke of said rod, a pipe disposed around the valve rod and connected to the solids detaching means, and means on the valve rod for operating the solids detaching means through the medium of said pipe, said means comprising a member on the valve rod adapted to engage with the lower end of the pipe.

17. Apparatus for separating the liquid and solid components of mixtures of liquids and crushed or ground ore products, comprising, in combination, a settling vessel, a valve and valve rod in said vessel, means for removing the settled solids from the vessel, said means including a casing which is in communication with the bottom of the vessel, a rod adapted to be reciprocated in said casing, and plates having openings and arranged upon and spaced apart along the length of said rod, means for reciprocating the latter rod and for opening the valve on the out-stroke of said rod, a guide for the valve rod fixed in the vessel and a cover fixed to the rod around the guide.

In testimony whereof I have signed my name to this specification in the presence of two subscribing witnesses.

ALEXANDER JOHN ARBUCKLE.

Witnesses:
    CHAS. O. VENDALE,
    V. WESTON.